April 1, 1930.  R. B. OTWELL  1,752,962
WINCH ATTACHMENT FOR TRACTORS
Filed Nov. 2, 1927   5 Sheets-Sheet 1

Inventor
Ralph B. Otwell
By S. E. Thomas
Attorney

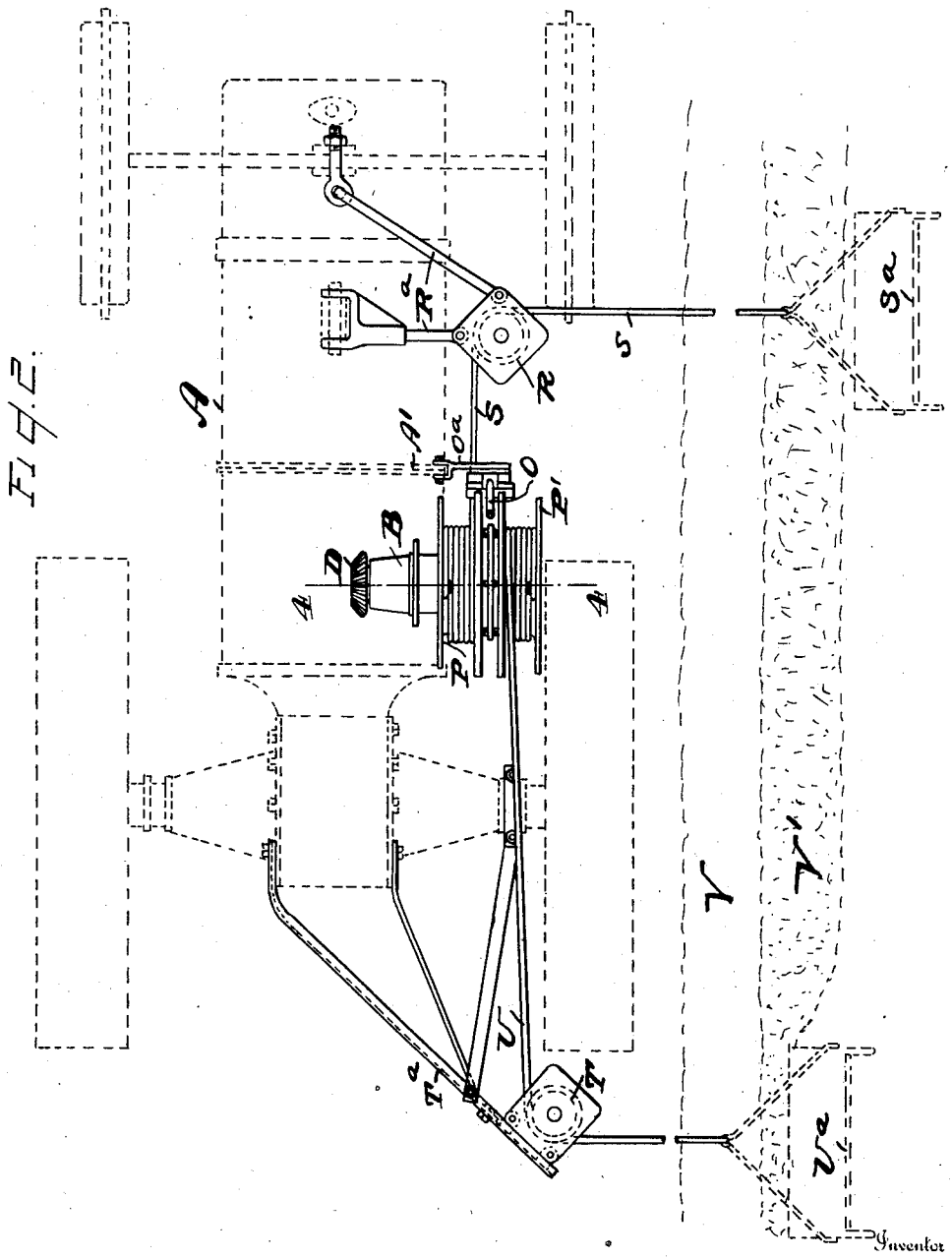

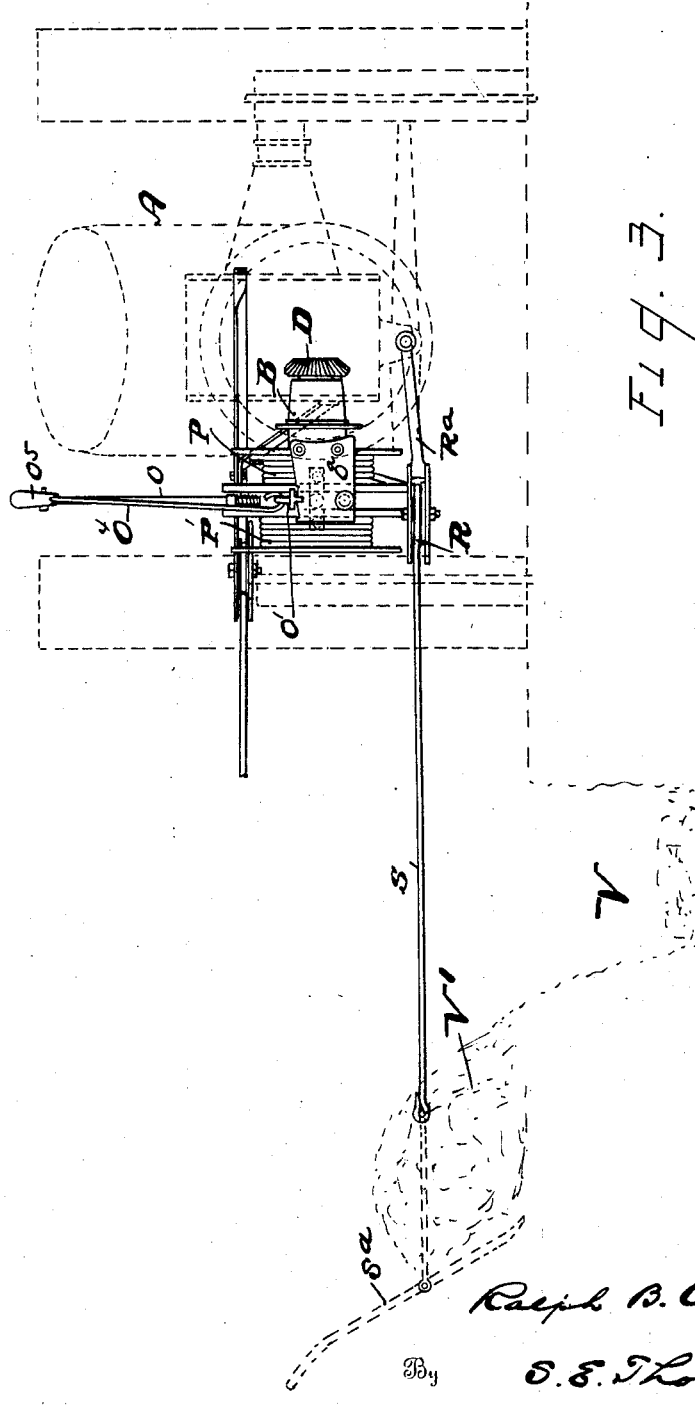

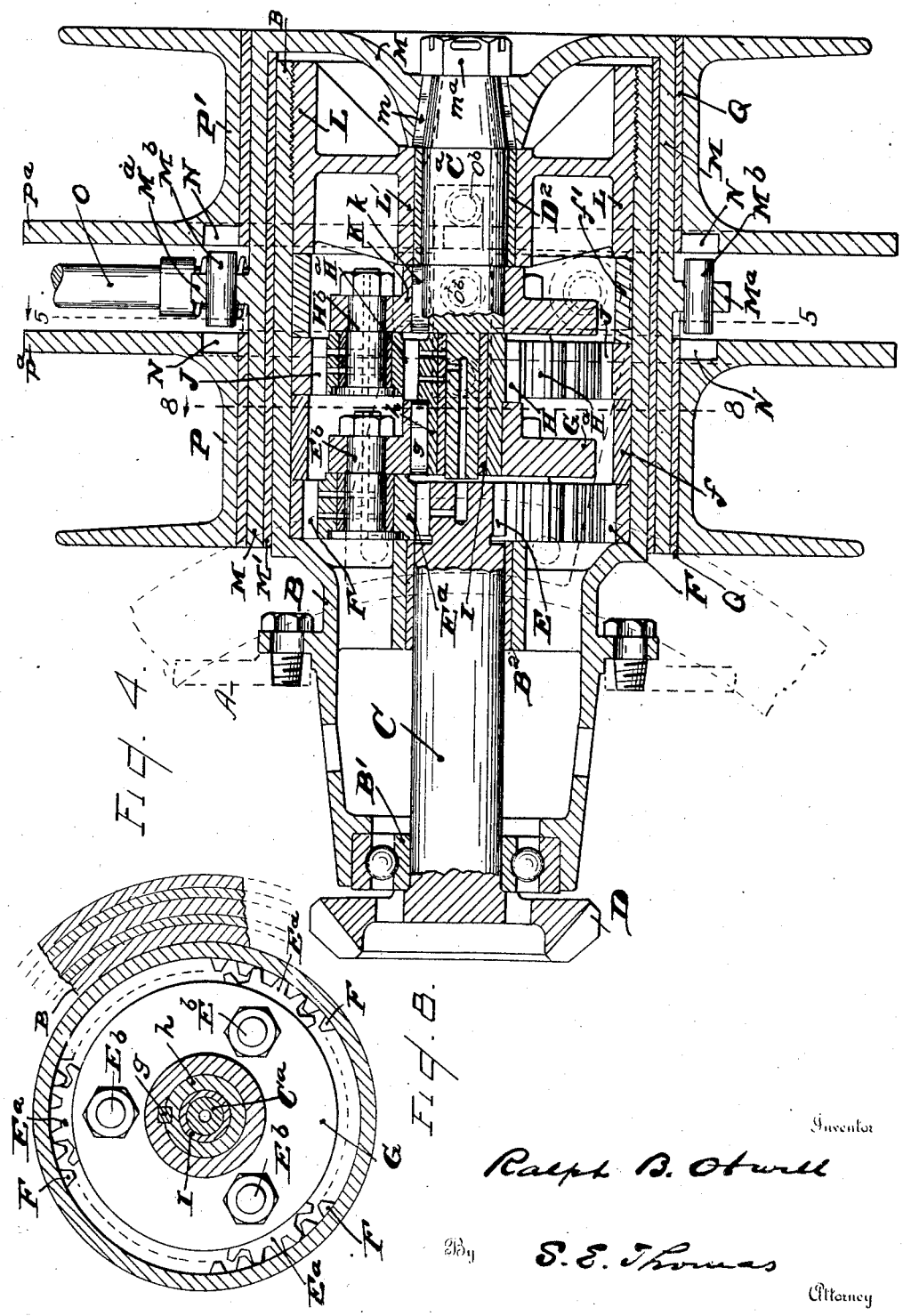

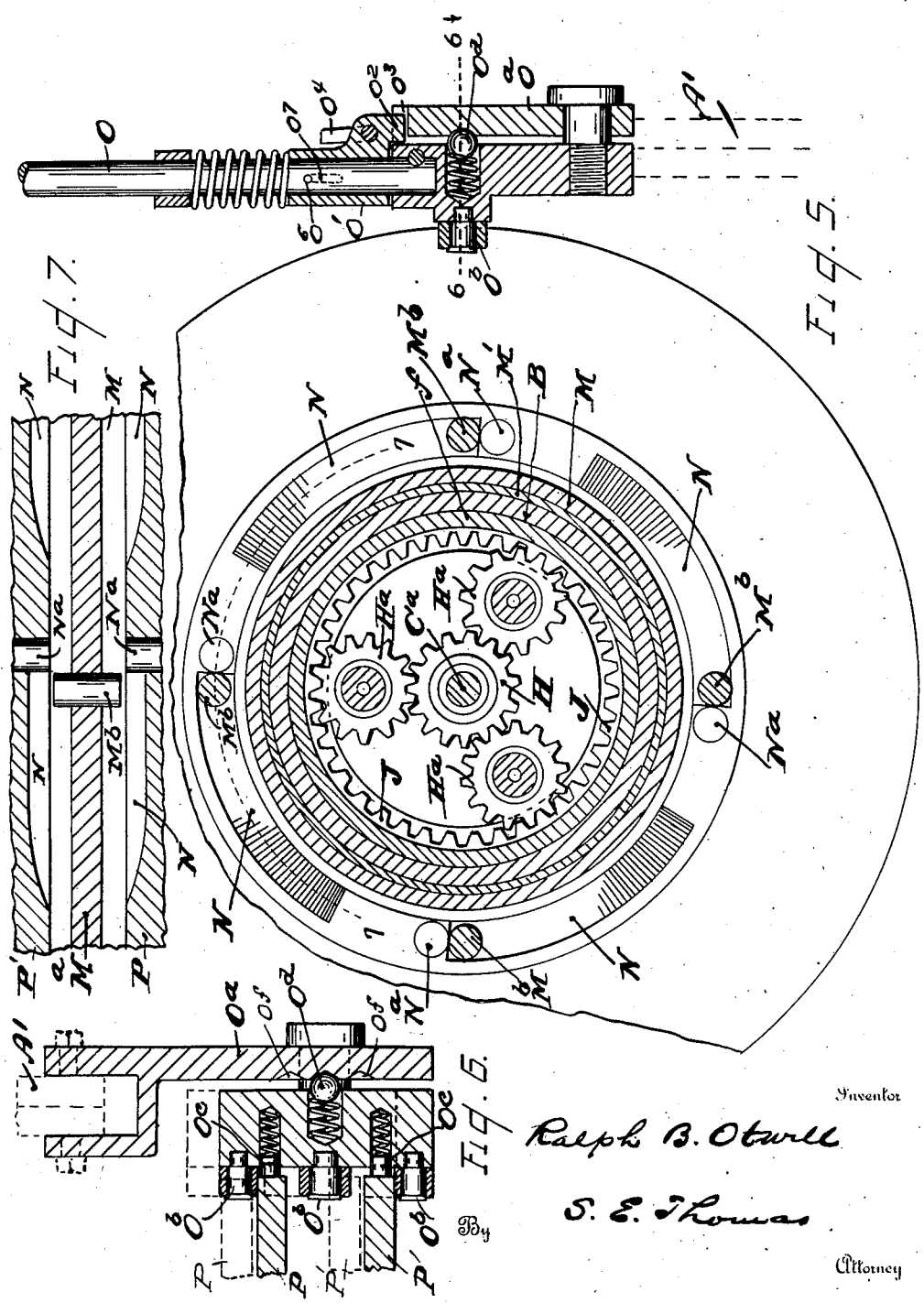

Patented Apr. 1, 1930

1,752,962

UNITED STATES PATENT OFFICE

RALPH B. OTWELL, OF DETROIT, MICHIGAN, ASSIGNOR TO DETROIT HARVESTOR COMPANY, OF DETROIT, MICHIGAN, A CORPORATION OF MICHIGAN

WINCH ATTACHMENT FOR TRACTORS

Application filed November 2, 1927. Serial No. 230,508.

This invention relates to a winch attachment for tractors designed for winding a plurality of cables whereby they may alternately pull or haul a load.

The primary object of the invention is to provide a power winch attachment for use in connection with a well-known tractor, adapted to alternately wind and release a pair of cables respectively attached to a pair of scrapers for refilling open ditches or trenches with the soil taken therefrom.

A further object of the invention is to provide a simple and inexpensive device including a pair of winding reels adapted to alternately wind and release a pair of cables respectively attached to a pair of scrapers employed for returning soil removed from trenches made to receive sewer pipes, water mains, underground conduits, or the like, the object being to provide continuous uninterrupted operation that the work of refilling a ditch may be accelerated.

A further object of the invention is to provide a unit, which may be readily attached to or removed from the tractor, whereby the tractor may be used for pulling by winding, and alternately releasing one of a pair of cables, which may be employed in various ways and particularly as shown in the present embodiment in connection with a pair of scrapers for returning the refill soil to a ditch without interfering with the use of the tractor for other purposes when required.

It is the purpose of this invention to provide a self-contained unit comprising a drive shaft fitted with a bevel gear actuated by a bevel gear on the transmission shaft (not shown) of the tractor, said drive shaft being journalled in a laterally extending housing bolted to the tractor,—the unit including planetary gears, driven by the drive shaft for operating at reduced speed a pair of winding drums of the winch head, also forming part of the unit.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 2 is a diagrammatic plan view of the power winch bolted to the wall of a tractor—shown in dotted lines—indicating also in dotted lines the open cut of a ditch with the soil removed therefrom and placed at one side of the ditch in position to be returned to the latter through the alternate operation of a pair of scrapers attached to hauling cables wound upon the reels of the winch head.

Figure 3 is a diagrammatic end elevation of the device bolted to a tractor—shown in dotted lines—indicating also in dotted lines the ground level and ditch with the soil removed and placed at one side of the ditch, to be returned thereto by the scraper—shown in dotted lines—attached to a hauling cable connected with the winch.

Figure 4 is a cross-sectional view through a pair of winding drums or reels sleeved upon the housing enclosing the planetary gearing of the winch mechanism, showing its drive shaft fitted with a bevel gear which in turn meshes with a like gear (not shown) carried by the transmission shaft of the tractor.

Figure 1:
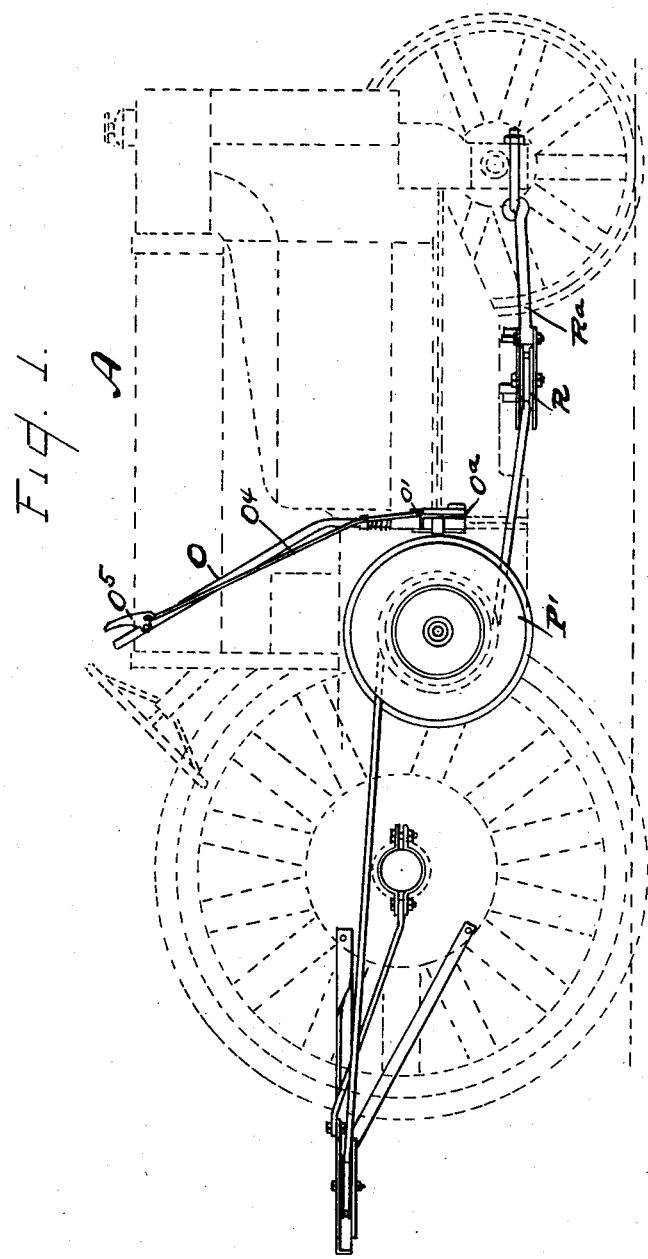
Figure 1 is a side elevation—diagrammatic in character—showing in dotted lines a well-known tractor and in full lines a power winch attached thereto and actuated by the tractor, adapted to alternately and respectively wind and release one of a pair of cables attached to the winding reels.

Figure 5 is a cross-sectional view taken on or about line 5—5 of Figure 4—with the flange of one of the winding drums broken away to provide room for other views on the sheet, showing also in section a fragmentary part of a manually operated lever mechanism for alternately connecting the respective winding drums with the driving mechanism, whereby the drums may be periodically wound and released to effect the delivery of soil into the ditch by one scraper while manually returning the other scraper for a load.

Figure 6 is a fragmentary cross-sectional view—taken on or about line 6—6 of Figure 5—showing a yieldable frictional drag adapted to bear upon the rim of the winding reels to control the free rotation of the latter.

Figure 7 is a fragmentary cross-sectional view through the flanges of the respective winding drums or reels—taken on an arc indicated by the dotted lines 7—7 in Figure 5—through an arcuate recess—inclined at one end—formed in the flanged walls of the winding drums.

Figure 8 is a fragmentary cross-sectional view taken on or about line 8—8 of Figure 4, with the walls of the housing and drum broken away to provide space to accommodate another view on the sheet.

Referring now to the letters of reference placed upon the drawings:

A denotes a tractor to which is bolted a laterally extending housing B enclosing a shaft C provided at one end with a bevel gear D driven by a bevel gear carried by the transmission shaft (not shown) of the tractor.

The shaft C is journalled in suitable bearings $B^1$ and $B^2$ in the housing B. At the end of the shaft C is a pinion E in mesh with pinions $E^a$, $E^a$, $E^a$, which in conjunction with an internal gear F constitutes a planetary gearing to provide a suitable speed reduction.

The pinions $E^a$ are respectively carried by a plurality of stub shafts $E^b$, mounted in a disc G, keyed at $g$ to the projecting sleeve $h$ of a pinion H, mounted upon a bushing I, encircling the relatively smaller projecting end of the shaft $C^a$, in longitudinal alignment with the shaft C, and forming a bearing for the pinion H in mesh with pinions $H^a$, $H^a$, $H^a$, and the latter with an internal gear J,—thus providing a second planetary train of gearing to effect a further reduction of speed.

The respective pinions $H^a$ are mounted upon a plurality of stub shafts $H^b$ supported in a disc K keyed at $k$ to the extension shaft $C^a$. L denotes a sleeve nut screwed into the end of the housing B, provided with a bearing $L^1$ and fitted with a bushing $D^2$ for the extension shaft $C^a$ journalled in the bearing.

A spacing ring $f$ is located between the internal gears F and J, and a similar spacing ring $f^1$ is provided between the internal gear J and the sleeve nut L. By adjusting the sleeve nut L the several parts may be secured against rotation or lateral play.

Keyed at $m$ at the end of the shaft $C^a$ is a driving sleeve M, secured upon the shaft by a retaining nut $m^a$ screwed thereon. Between the driving sleeve M and the housing B is a bushing $M^1$, and projecting outwardly and medially from the driving sleeve M is a flange $M^a$ in which are secured a plurality of transversely extending pins $M^b$ projecting in opposite directions from the flange.

The pins $M^b$ are adapted to enter a plurality of inclined arcuate grooves N,—respectively formed in the opposing flanged walls of a pair of winding drums P and $P^1$, mounted in spaced relation to each other upon a bushing Q surrounding the sleeve,—upon shifting the reels longitudinally by a manual operation of a controlling lever O, pivoted in a bracket $O^a$, bolted to a flange $A^1$ projecting outwardly from the wall of the tractor,—the lever O being fitted with studs $O^b$ adapted to contact with the flange of the reels to cause the reels to move longitudinally upon said bushing.

$N^a$ are hard-metal pins set in the wall at the end of the arcuate grooves N to receive and take the wear occasioned by the thrust of the overlapping driving pins $M^b$ projecting from the flange of the driving sleeve.

$O^c$ are spring actuated brake shoes designed to impinge upon the rims $P^a$ of the winding reels for checking the drums from rotating too freely when unwound. $O^d$ is a spring actuated detent carried by the lever which is adapted to enter a series of spaced recesses $O^t$ in the bracket $O^a$ to yieldingly secure the lever, following an alternate shifting of the winding reels to engage the transverse pins $M^b$ of the driving sleeve.

$O^1$ is a spring actuated dog slidable upon the lever O having a projecting tongue $O^2$ adapted to enter a recess $O^3$ in the bracket $O^a$ to secure the lever in neutral position. $O^4$ is a rod connecting the dog with a rocking lever $O^5$, pivoted to the lever O, whereby upon operating the lever $O^5$ the dog may be withdrawn from the recess $O^3$ in the bracket. $O^6$ indicates a pin projecting from the lever O into a slot $O^7$ in the slidable dog for guiding the latter into locking engagement with the recess $O^3$ in the bracket.

R is a sheave, supported in a bracket $R^a$ secured to the underside of the tractor, to receive and guide a cable S connected with the winding drum P, and a scraper $S^a$—shown in dotted lines in Figure 2.

T is a sheave, supported by a bracket $T^a$ bolted to the rear axle housing of the tractor, to receive and guide a cable U secured to the winding reel $P^1$ at one end, and at the other end to a scraper $U^a$.

The brackets $R^a$ and $T^a$ are pivotally connected to the tractor that they may have a slight swinging movement to accommodate themselves to the position of the hauling cables. V denotes an open ditch and $V^1$ the soil removed therefrom,—see Figures 2 and 3.

Having indicated the several parts by reference letters, the construction and operation of the device will be readily understood.

The winding reels P and P¹ are respectively driven and released from driving relation with the drive shaft C by alternately shifting the reels into and out of inter-locking engagement with the pins M^b supported in the flange M^a of the driving sleeve M,—the extension shaft C^a to which the sleeve is secured being actuated at a suitable speed through the planetary reduction gearing G and H.

The hauling cable of the driven reel is thereby wound upon the latter, dragging the scraper attached to the cable with its load of earth toward the open ditch that it may be discharged into the latter,—the adjacent winding reel being simultaneously released from driving engagement that its cable may be unwound and the scraper attached thereto manually returned in position to receive a load of earth for delivery into the ditch immediately upon reversing the controlling lever to drive the reel just released.

This alternate operation of the respective winding drums and scrapers is continued until the ditch is filled,—the tractor being driven along the line of the ditch as the work progresses until the entire cut is completely refilled.

Having thus described my invention what I claim is:

1. In a pulley and clutch mechanism, a rotatable driving sleeve, a pair of spaced winding pulleys slidably mounted on the sleeve, a flange extending outwardly from the sleeve for disposition between the pulleys, a plurality of laterally extending driving pins projecting in opposite directions from the sides of said flange, the opposed faces of the pulleys having spaced arcuate shaped grooves arranged circumferentially for receiving the respective pins, a shoulder at one end of each groove against which the respective pin engages, and means for manually shifting the pulleys alternately into engagement with the lateral pins to selectively rotate the pulleys simultaneously with the sleeve.

2. In a pulley and clutch mechanism, a rotatable driving sleeve, a pair of spaced winding pulleys slidably mounted on the sleeve, a flange extending outwardly from the sleeve for disposition between the pulleys, a plurality of laterally extending driving pins projecting in opposite directions from the sides of said flange, the opposed faces of the pulleys having spaced arcuate shaped grooves arranged circumferentially for receiving the respective pins, a hardened pin at one end of each groove to receive the thrust of the pins, and means for manually shifting the pulleys alternately into engagement with the lateral pins to selectively rotate the pulleys simultaneously with the sleeve.

3. In a pulley and clutch mechanism, a rotatable driving sleeve, a pair of spaced winding pulleys slidably mounted on the sleeve, a flange extending outwardly from the sleeve for disposition between the pulleys, a plurality of laterally extending driving pins projecting in opposite directions from the sides of said flange, the opposed faces of the pulleys having spaced arcuate shaped grooves arranged circumferentially for receiving the respective pins, a shoulder at one end of each groove against which the respective pin engages, and means for manually shifting the pulleys alternately into engagement with the lateral pins to selectively rotate the pulleys simultaneously with the sleeve, said grooves being inclined from the bottom outwardly to the face of the pulley to effect the release of the pins when the pulleys are rotated in the reverse direction.

4. In a power winch attachment for tractors, a casing adapted to be secured to a tractor, a power take-off shaft journalled in the casing, a driving gear on the shaft having cooperative engagement with the transmission shaft of a tractor, a secondary power take-off shaft, a plurality of reducing gears operatively connecting the first-mentioned power take-off shaft with the second mentioned shaft, a rotatable driving sleeve, an annular flange extending outwardly therefrom, a plurality of driving pins carried by the flange and extending outwardly from the opposed faces thereof, a pair of winding pulleys slidably mounted on the driving sleeve on opposite sides of the flange, the opposed faces of the pulleys having arcuate shaped grooves arranged circumferentially therein, a shoulder at one end of each groove, the pins being operable within the respective grooves and adapted to engage with said shoulder, and means for manually shifting the pulleys alternately into engagement with the lateral pins to selectively rotate the pulleys simultaneously with the driving sleeve.

5. In a pulley and clutch mechanism, a rotatable driving sleeve, a pair of spaced winding pulleys slidably mounted on the sleeve, a flange extending outwardly from the sleeve for disposition between the pulleys, a plurality of laterally extending driving pins projecting in opposite directions from the sides of said flange, the opposed faces of the pulleys having spaced arcuate shaped grooves arranged circumferentially for receiving the respective pins, a shoulder at one end of each groove against which the respective pin engages, and means for manually shifting the pulleys alternately into engagement with the lateral pins to selectively rotate the pulleys simultaneously with the sleeve, said last mentioned means including a manually operable pivoted lever, and a projecting stud carried by the lever for co-operation with the flanges of the respective winding pulleys.

6. In a power winch attachment for tractors, a casing secured to a tractor, a power take-off shaft adapted to be actuated by the tractor, a second shaft arranged in alinement with the power take-off shaft, speed reduction gearing interconnecting said shafts together, a driving sleeve keyed to the second shaft, a pair of winding pulleys encircling the sleeve, and means for manually and alternately coupling the winding pulleys with the sleeve for rotation therewith.

In testimony whereof, I sign this specification.

RALPH B. OTWELL.